United States Patent
Wang et al.

(10) Patent No.: US 11,885,713 B2
(45) Date of Patent: Jan. 30, 2024

(54) COUPLING DESIGN FOR COUPLING SIMULATED FLESH TO A SUPPORT STRUCTURE OF AN ANTHROPOMORPHIC TEST DEVICE

(71) Applicant: Humanetics Innovative Solutions, Inc., Farmington Hills, MI (US)

(72) Inventors: Zhenwen J. Wang, Farmington Hills, MI (US); Joseph P. McInnis, New Hudson, MI (US); Thanh Nghi, Ann Arbor, MI (US); John A. Arthur, Milan, OH (US)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 0 days.

(21) Appl. No.: 16/991,546

(22) Filed: Aug. 12, 2020

(65) Prior Publication Data
US 2021/0048373 A1    Feb. 18, 2021

Related U.S. Application Data

(60) Provisional application No. 62/886,186, filed on Aug. 13, 2019.

(51) Int. Cl.
*G01M 17/007* (2006.01)
*G09B 23/00* (2006.01)

(52) U.S. Cl.
CPC ......... *G01M 17/0078* (2013.01); *G09B 23/00* (2013.01)

(58) Field of Classification Search
None
See application file for complete search history.

(56) References Cited

U.S. PATENT DOCUMENTS

| 2,102,901 A | * | 12/1937 | Laursen | ................. A43B 21/42 36/35 R |
| 3,755,920 A | * | 9/1973 | Smrcka | ................. G09B 23/32 434/274 |

(Continued)

FOREIGN PATENT DOCUMENTS

| DE | 3913356 A | * | 1/1990 | .............. F16B 43/00 |
| EP | 3273430 A1 | | 1/2018 | |

(Continued)

OTHER PUBLICATIONS

European Search Report for Application EP 20 19 0720 dated Jan. 18, 2021, 2 pages.

*Primary Examiner* — Jill E Culler
(74) *Attorney, Agent, or Firm* — Howard & Howard Attorneys PLLC

(57) ABSTRACT

An anthropomorphic test device utilizes a mounting mechanism for coupling a hollow member including a simulated flesh to a support structure, with the simulated flesh including a foam core portion covered with a skin portion. The mounting mechanism includes inserts, such as plastic or metal inserts having a flange portion and an elongated tubular member, which are introduced in multiple places within the simulated flesh with the flange portion within the foam core portion and the elongated tubular member extending through the skin portion. A fastening member is inserted through an elongated opening in the insert and within a receiving cavity portion of the support structure to secure the hollow member to the support structure. The hollow member may be a hollow pelvic member, and the support structure may be a pelvic support structure, with the hollow pelvic member secured to the pelvic support structure via the mounting mechanism.

20 Claims, 10 Drawing Sheets

(56) References Cited

U.S. PATENT DOCUMENTS

| | | | | | |
|---|---|---|---|---|---|
| 4,261,113 | A | * | 4/1981 | Alderson | G01M 17/0078 434/274 |
| 4,439,162 | A | * | 3/1984 | Blaine | G09B 23/34 434/273 |
| 2004/0099825 | A1 | * | 5/2004 | Huang | G01M 17/0078 250/225 |
| 2005/0126258 | A1 | * | 6/2005 | Lipmyer | G01M 17/0078 73/12.09 |
| 2013/0000426 | A1 | * | 1/2013 | Arthur | G09B 23/28 73/866.4 |
| 2014/0335493 | A1 | * | 11/2014 | Locca | G09B 23/32 434/256 |
| 2017/0301264 | A1 | | 10/2017 | Vara et al. | |

FOREIGN PATENT DOCUMENTS

| | | | | |
|---|---|---|---|---|
| FR | 2683320 | A1 * | 5/1993 | ............... G01L 1/02 |
| FR | 3095787 | A1 * | 11/2020 | ......... B60R 13/0838 |
| WO | 2020061568 | A1 | 3/2020 | |
| WO | 2020061575 | A1 | 3/2020 | |

\* cited by examiner

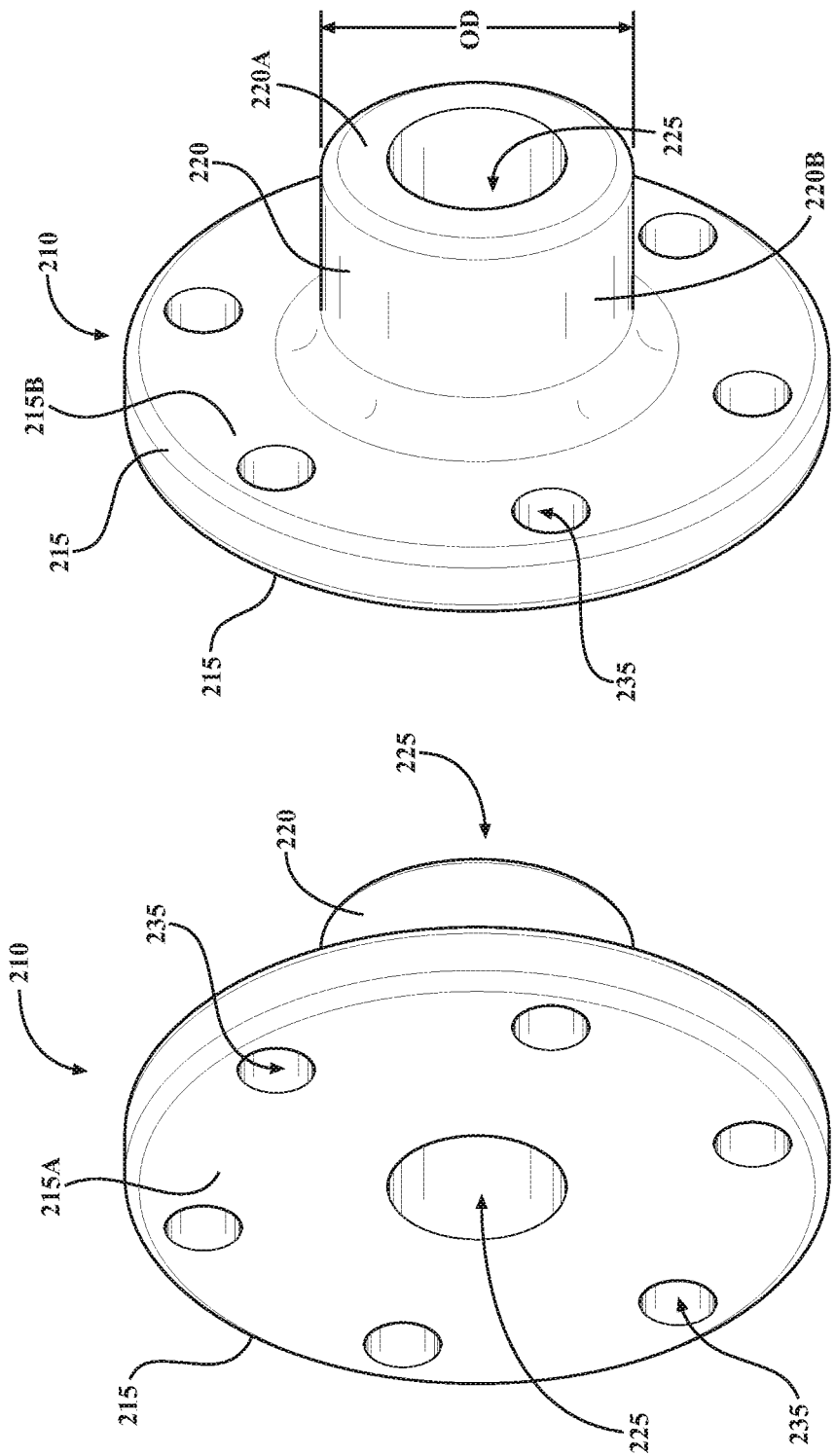

COUPLING DESIGN FOR COUPLING SIMULATED FLESH TO A SUPPORT STRUCTURE OF AN ANTHROPOMORPHIC TEST DEVICE

CROSS REFERENCE TO RELATED APPLICATIONS

This application claims the benefit of U.S. Provisional Application No. 62/886,186 filed Aug. 13, 2019, the disclosure of which is herein incorporated by reference in its entirety.

BACKGROUND OF THE INVENTION

1. Field of the Invention

The present invention relates generally to anthropomorphic test devices and, more particularly, to a coupling design for coupling simulated flesh to a support structure of an anthropomorphic test device.

2. Description of the Related Art

Automotive, aviation, and other vehicle manufacturers conduct a wide variety of collision testing to measure the effects of a collision on a vehicle and its occupants. Through collision testing, sometimes otherwise referred to as crash testing, a vehicle manufacturer gains valuable information that can be used to improve the vehicle.

Collision testing often involves the use of anthropomorphic test device, sometimes alternatively referred to as anthropomorphic mannequins, and better known as "crash test dummies", to estimate a human's injury risk. The crash test dummy typically includes a head assembly, spine assembly, rib cage assembly, pelvis assembly, right and left arm assemblies, and right and left leg assemblies. Joints are provided to couple various assemblies together and to allow articulation that simulates the human range of motion. In addition, these assemblies are typically covered with a simulated flesh that includes an inner foam material covered with a skin portion. The anthropomorphic test device must possess the general mechanical properties, masses, joints, and joint stiffness of the humans of interest. In addition, the anthropomorphic test device must possess sufficient mechanical impact response to cause them to interact with the vehicle's interior in a human-like manner during the collision testing.

Often times in these devices (a representative device 15 is shown in FIG. 1), there is a separation issue (shown by arrow 17) between the simulated flesh 16 and the support structure 18 (and in particular as shown in FIG. 1 as between the simulated flesh 16 and the pelvic bone 19 of the pelvic support structure 18), shown in FIG. 1. A few current designs address the separation issues, but not able to retain the function to have the simulated flesh removable from the support structure. For example, some crash test dummies include a pelvis assembly having the pelvic support structure bone completely embedded in the simulated flesh, and, as such, the simulated flesh is not separable from the pelvic support structure. The non-removable simulated flesh prevents the user from integrating sensors into the support structure, with the sensors capable of being used for measuring the crash loads within an assembly that are used for injury predictions. Other crash test dummies have a removable simulated flesh, but the lack of coupling the simulated flesh and the support structure.

The present invention addresses and minimizes or overcomes the separation issues between the simulated flesh and support structure associated with the prior art designs and provides therefore a crash test dummy having a more human-like response during collision testing.

SUMMARY OF THE INVENTION

The present invention provides a mounting mechanism that couples together a hollow member including a simulated flesh with a support structure of an anthropomorphic test device.

In particular, the hollow member includes a simulated flesh having an inner foam core portion covered with a skin portion and with the hollow member defining an inner cavity, wherein the skin portion includes an outer skin portion and an inner skin portion. The support structure is received within the inner cavity. The mounting mechanism is coupled to each of the hollow member and the support structure and maintains the positioning of the simulated flesh relative to the hollow member during the crash test simulations.

The mounting mechanisms includes one or more inserts each respectively coupled within the simulated flesh. Each of the more inserts includes a flange portion having an outer surface and an opposing inner surface and positioned within the inner foam core portion and within the skin portion between the outer skin and inner skin portion. The inserts also include an elongated portion extending from the opposing outer surface, with the elongated portion extending through the inner skin portion in a direction towards the support structure. An elongated opening is defined within elongated portion and also extends through the flange portion between the inner and outer surface. The mounting mechanism also includes one or more fastening members inserted within the elongated opening of a corresponding one of the one or more inserts and secured to said support structure.

In certain embodiments, the hollow member is a hollow pelvic member, and the support structure is a pelvic support structure, and thus the mounting mechanism is used to secure the hollow pelvic member to the pelvic support structure so that the hollow pelvic member and pelvic support structure are mounted so as to simulate a human pelvis during a crash test simulation.

The flanges of the inserts provide a positive mechanical coupling to the skin portion by securing the fastening members, such as screws, to the support structure. The flange is intended to provide large mounting area to increase the mechanical parts engagement. By removing the fastening members, the simulated flesh of the region can be separated from the pelvic bone to allow sensor installation and dummy maintenance.

Other features and advantages of the present invention will be readily appreciated, as the same becomes better understood, after reading the subsequent description taken in conjunction with the accompanying drawings.

BRIEF DESCRIPTION OF THE DRAWINGS

FIGS. 7A-D are perspective views an insert used in the mounting mechanism of FIGS. 2-6.

DESCRIPTION OF THE PREFERRED EMBODIMENT(S)

Figure 1:
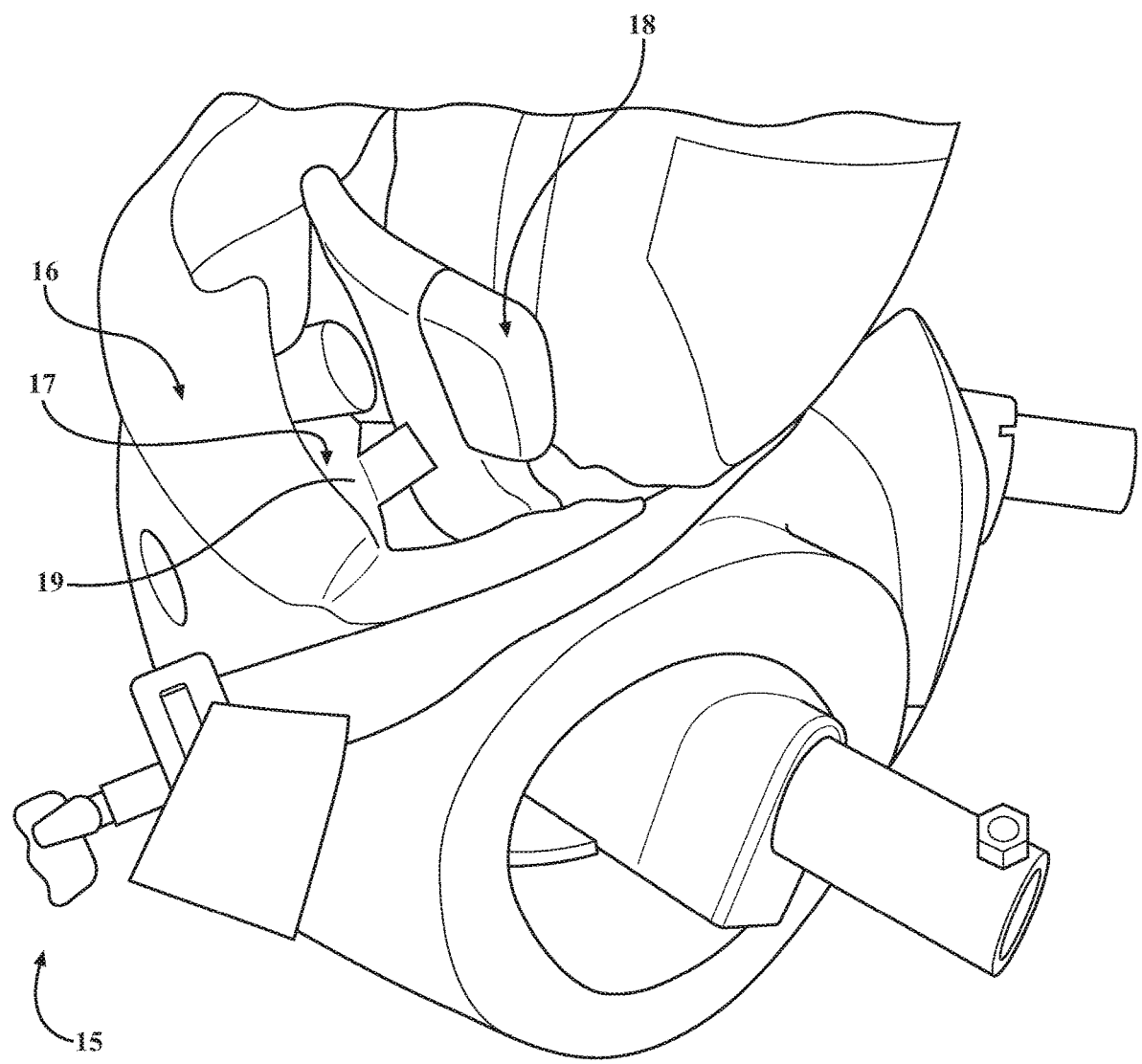
FIG. 1 is a perspective view of one embodiment of a portion of an anthropomorphic device in accordance with the prior art illustrating a separation issue between skin portion and a pelvic bond during or after a crash test simulation.
Figure 2:
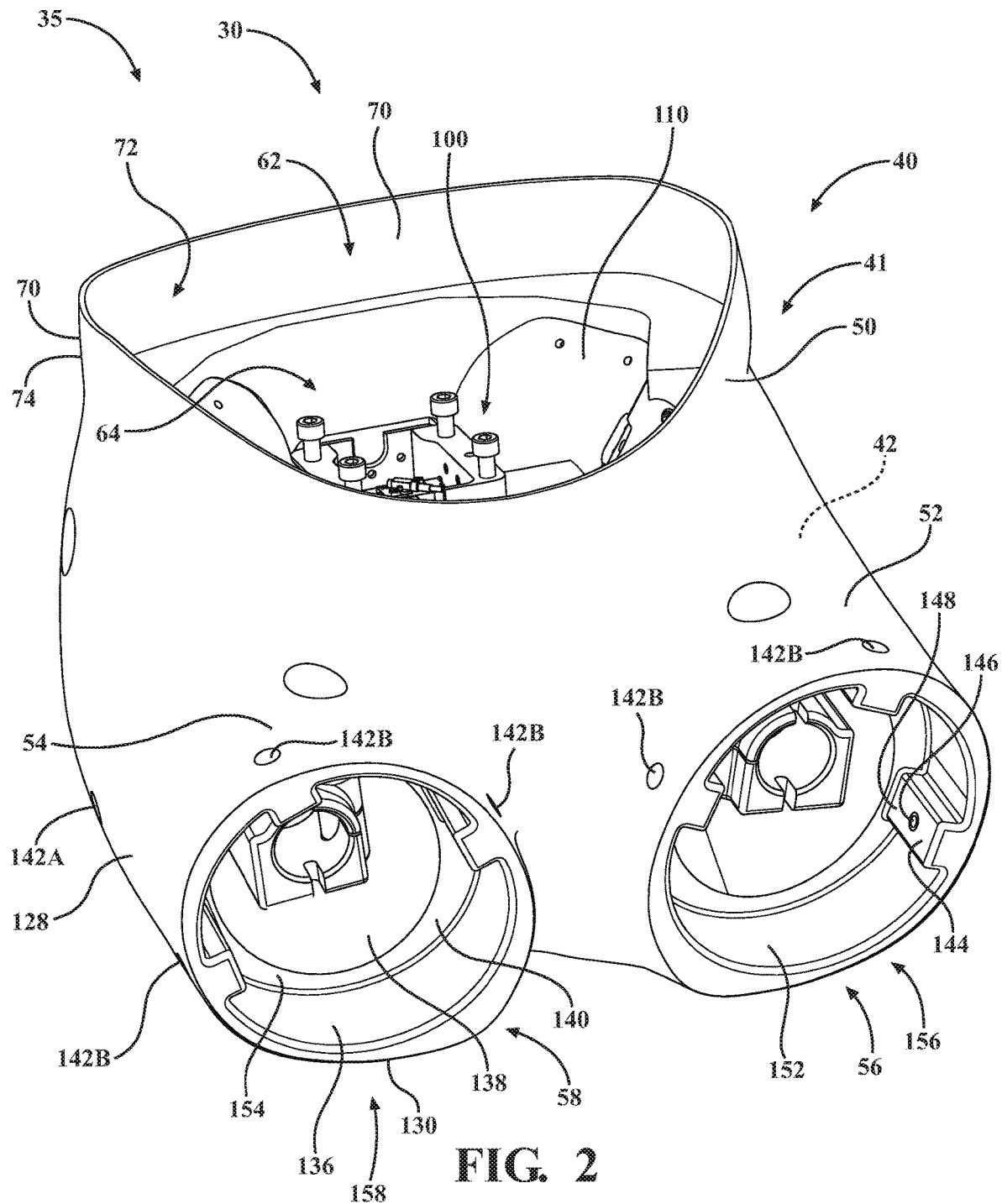
FIG. 2 is a front perspective view of an assembly of an anthropomorphic device having a mounting mechanism is accordance with one embodiment of the present invention.

Referring to FIG. 2, one embodiment of an anthropomorphic test device, or crash test dummy, is generally indicated at 30 and includes an assembly 35. The assembly 35 includes a member 40, which can be a pelvic member. The crash test dummy 30 also typically includes an abdomen member (not shown) coupled to the pelvic member 40, which together generally correspond to abdominal and pelvic region of the crash test dummy 30. A pair of lower thigh members (not shown) are also coupled to the pelvic member 40 such that the pelvic member 40 is disposed between the abdomen member and the pair of lower thigh members.

The crash test dummy 30 is of a fiftieth percentile (50%) male type and is illustrated in a sitting position. This crash test dummy 30 is used primarily to test the performance of automotive interiors and restraint systems for adult front and rear seat occupants. The size and weight of the crash test dummy 30 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

Figure 5:
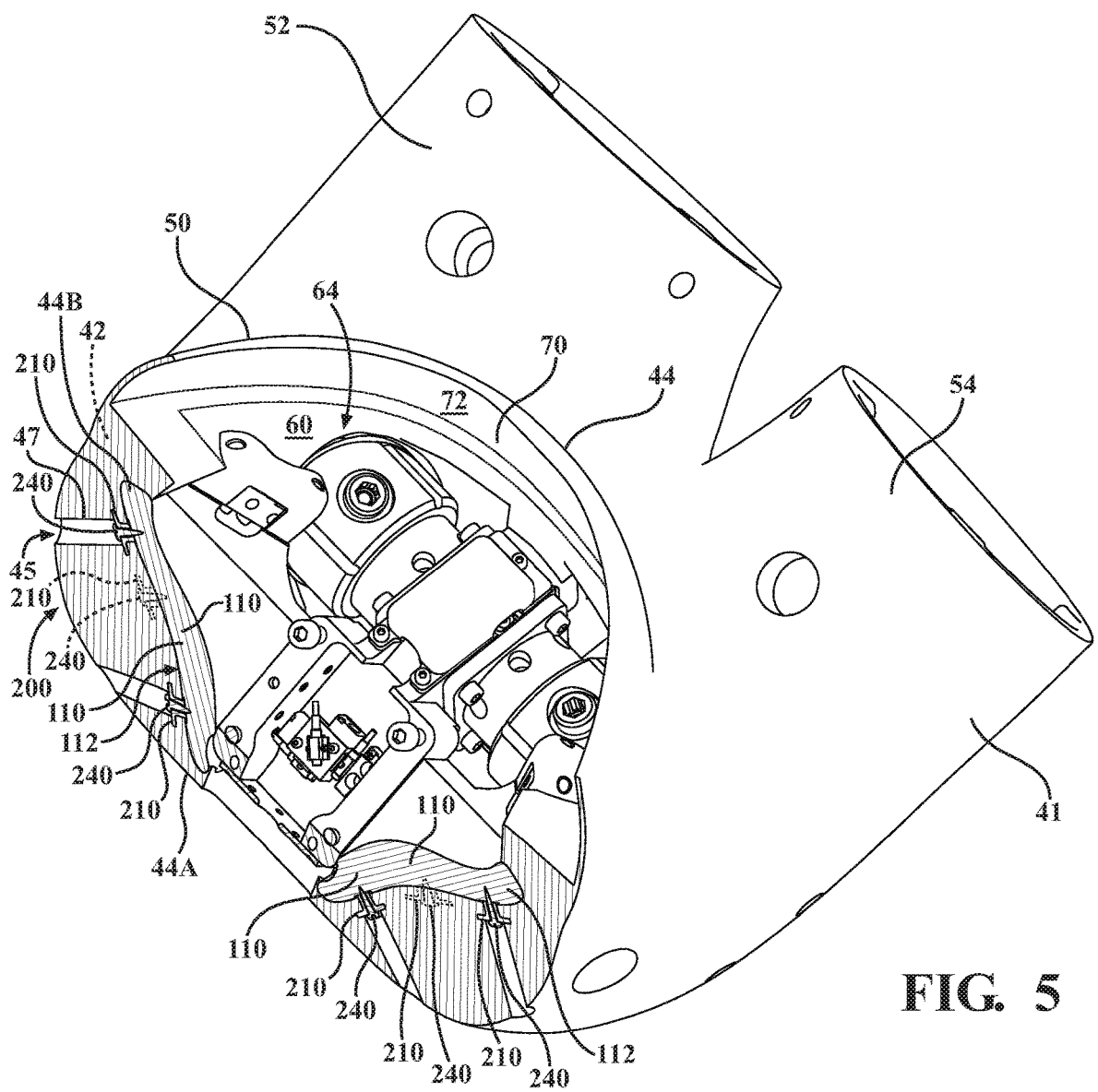
FIG. 5 is a rear view of FIG. 2 with a portion of the assembly removed.

Referring generally to FIGS. 3-9 and as best shown in FIGS. 2 and 5, the member 40 includes a simulated flesh 41 including an inner core foam portion 42 covered with a skin portion 44. The member 40 has a custom designed cavity (i.e., is a hollow member) to allow for the inclusion of a support structure 100 (see FIG. 4) to provide structural integrity to the crash test dummy 30 and to more closely simulate the structure and function of a particular region of a human. In the example shown, the region is the pelvis such that the invention provides a more human-like response of the pelvic region in collision testing. Accordingly, the skin portion 44 can be subdivided into an outer skin portion 44A and an inner skin portion 44B. As shown in the illustrated example, the pelvic member 40 includes a pelvic region 50 and a pair of upper thigh regions 52, 54 extending from the pelvic region 50 (see FIG. 5). It is to be appreciated that the subject invention could be incorporated into any suitable area of an anthropomorphic test device with corresponding simulated flesh and support structure.

As best shown in the illustrated example of FIGS. 3-6, the pelvic support structure 100 includes a pair of pelvic bones 110 connected to a central support structure 115, which itself serves as a portion of or may be coupled to the inner spinal structure (not shown) contained within the abdomen member (not shown). The pair of pelvic bones 110 are respectively shaped to correspond generally to the shape of the ilium bone of the pelvic girdle portion of the human pelvis. Each of the pair of pelvic bones 110 includes an exterior surface 112 and an opposing interior surface 114 that are connected to each other along an upper edge 116. The exterior surface 112 of the pelvic bone 110 extending from the upper edge 116 is generally sized and shaped to be contained within and aligned to a corresponding portion of respective inner surface 60 of the pelvic region 50 of the pelvic member 40 below the flap member 70. Also illustrated in FIGS. 3-6, the pelvic support structure 100 also includes a pair of upper thigh bones 118 coupled to and extending from the central support structure 115, with each of the upper thigh bones 118 being respectively sized and shaped to correspond to the upper portion of the human femur.

Figure 8:
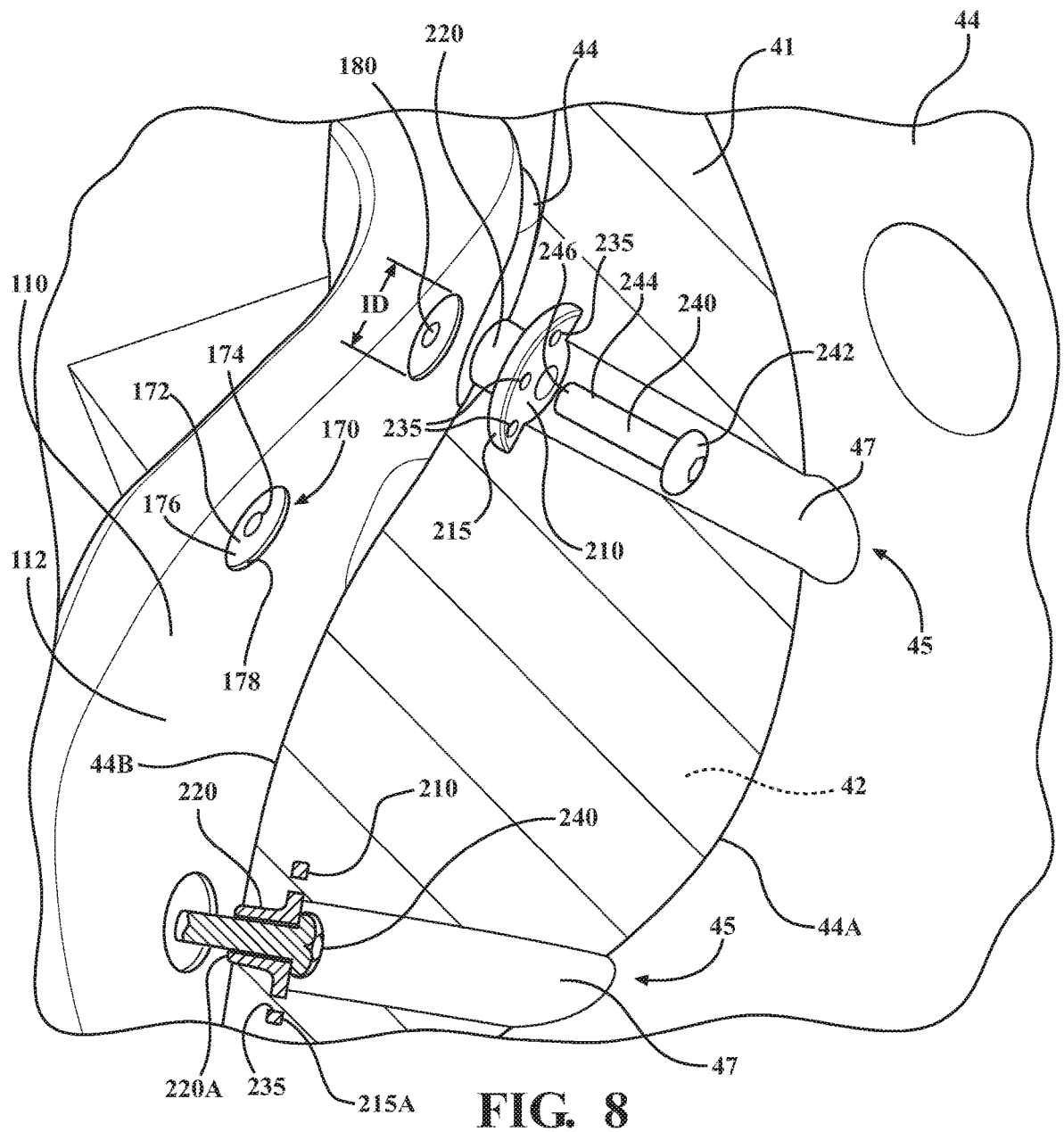
FIG. 8 is a partially exploded view of the mounting mechanism in proximity to and prior to coupling with a respective one of the bones of a support structure.

As best shown in FIG. 8 of the illustrated example, the exterior surface 112 of each of the pelvic bones 110 includes one or more receiving cavity portions 170 including a recessed region 172, here shown as a circular recessed region 172, and a receiving opening 174 extending inwardly from the recessed region 172. The receiving opening 174 may be threaded on non-threaded and in certain embodiments is tubular in shape. Each of the receiving cavity portions 170 are respectively configured to receive a mounting mechanism 200 (see FIG. 5) that is used to secure the pelvic member 40 to the respective pelvic bone 110, as will be described further below.

Figure 9:
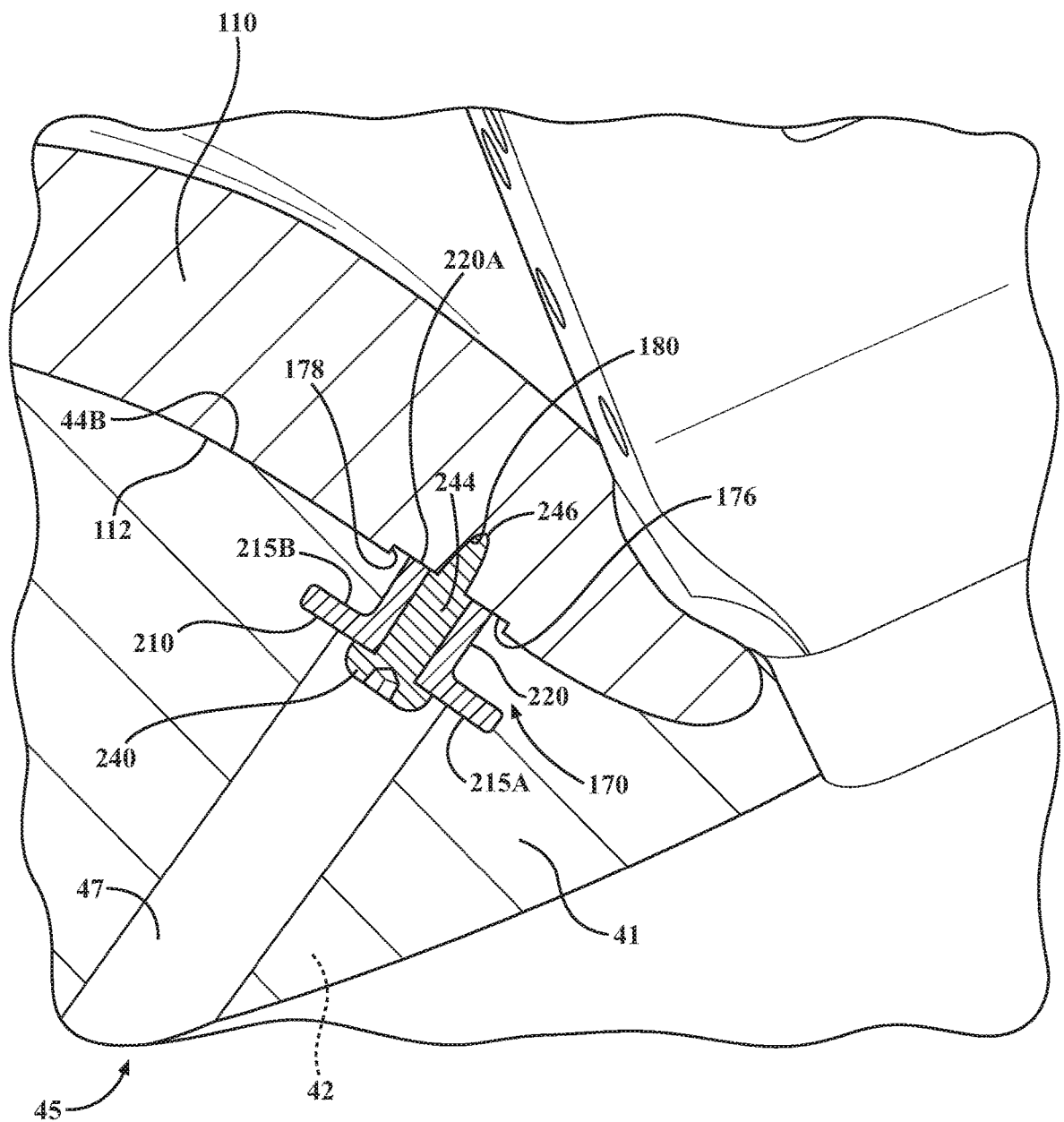
FIG. 9 is a partial perspective view of the mounting mechanism coupling the skin portion of the simulated flesh of the member to a respective one of the bones of the support structure.

The recessed region 172 includes a wall region 178 extending inwardly and transverse to the exterior surface 112 of each one of the pelvic bones 110 and also includes a bottom region 176 extending transversely from the wall region 178 that receives a portion of the mounting mechanism 200 when securing the pelvic member 40 to the respective pelvic bone 110. In certain embodiments, where the wall region 178 is circular, the surface of the circular wall region 178 may define an inner diameter ID. In certain embodiments, the bottom region 176 is flat, such as shown in FIGS. 8 and 9. The receiving opening 174 is defined by a wall region 180 that extends transverse and inwardly from a central portion of the bottom region 176.

The upper thigh regions 52, 54 are hollow (as will be described further below) and contain a respective one of the pair of upper thigh bones 118 and include respective insertion openings 56, 58 configured to receive additional members associated with the legs of the crash dummy 30 for connection within an opening 119 in the respective upper thigh bone 118.

Figure 3:
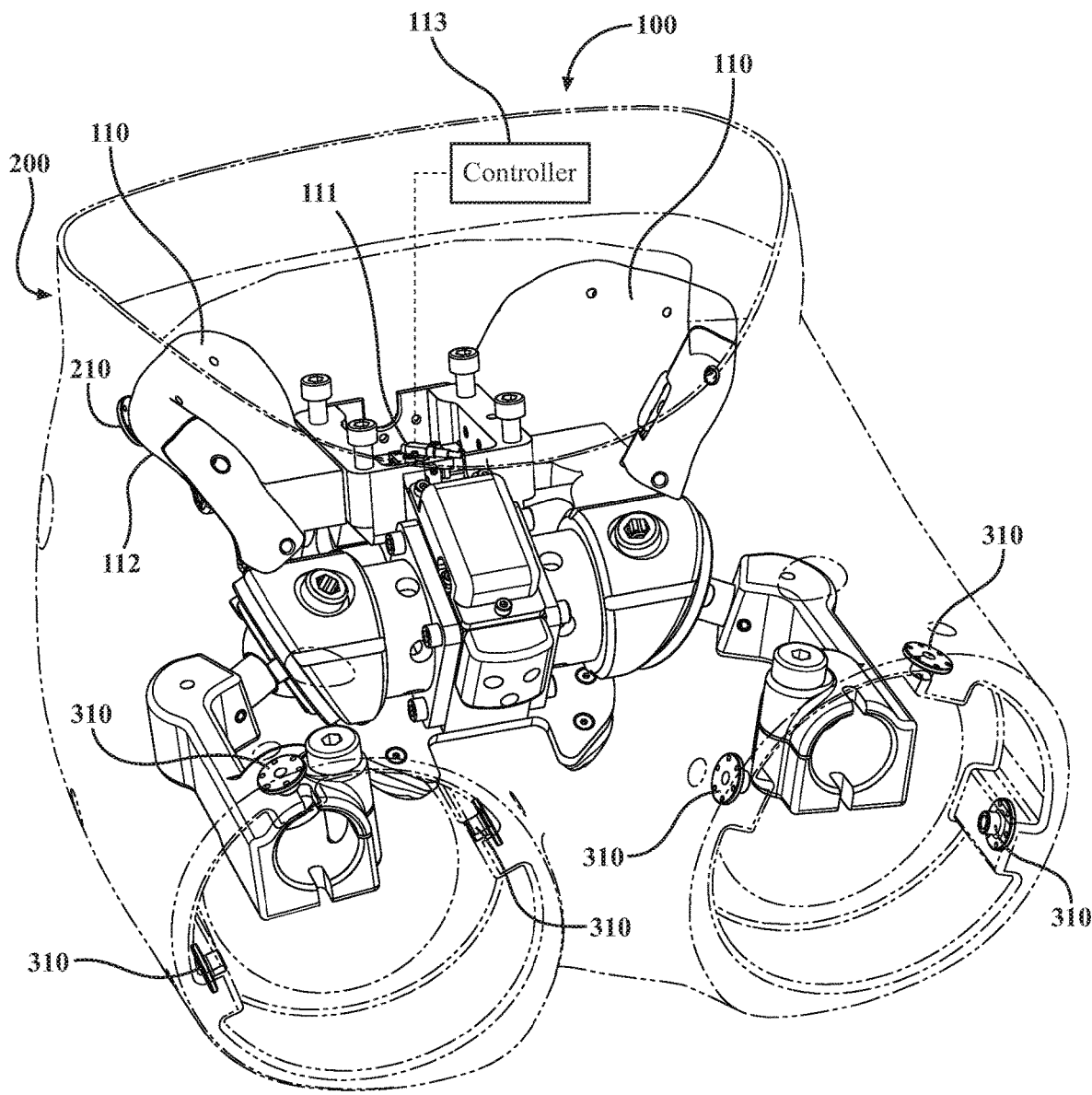
FIG. 3 is another front perspective view of FIG. 2 in which a member of the assembly is made transparent.
Figure 4:
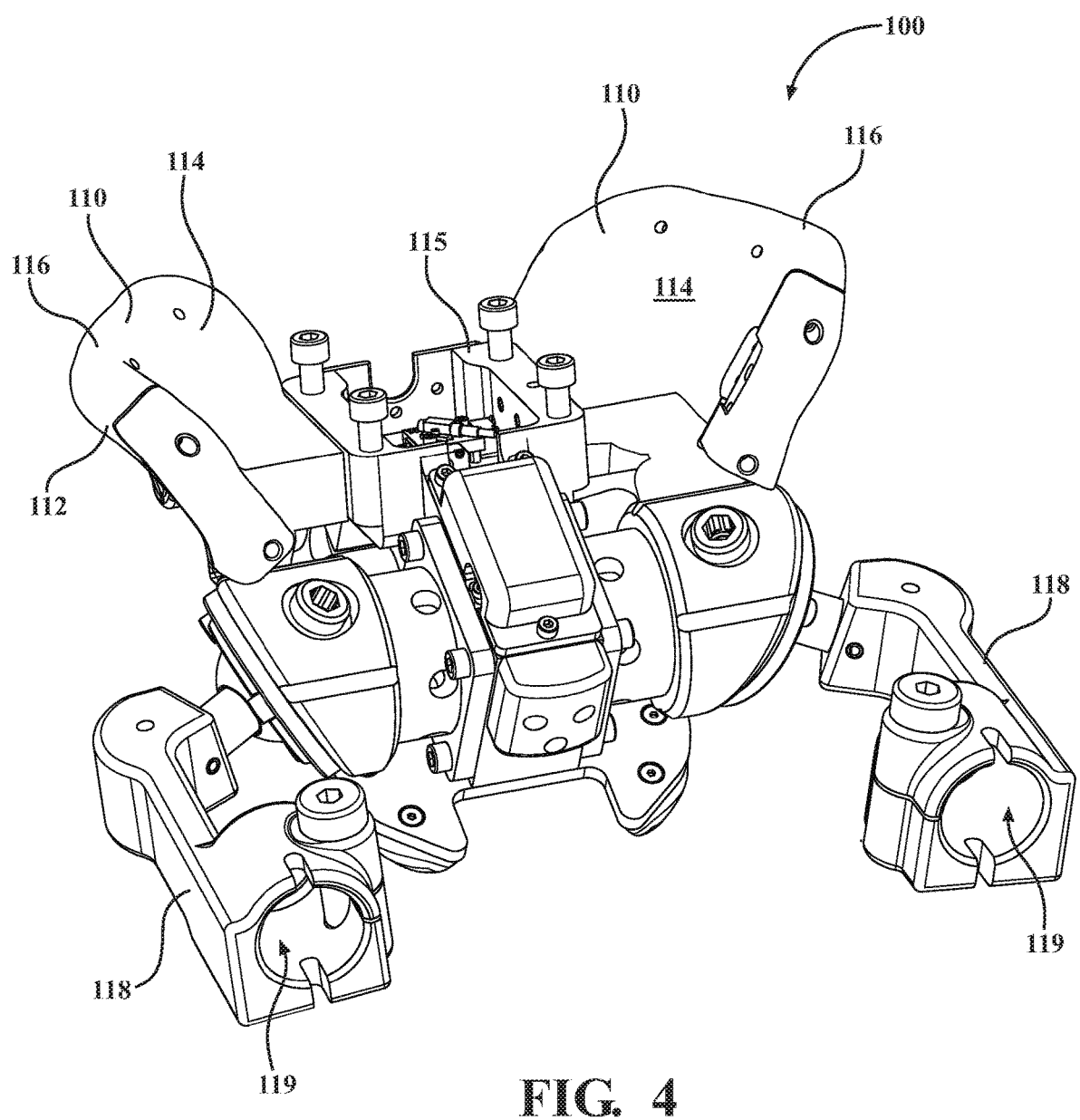
FIG. 4 is another front perspective view of FIG. 2 with the member and mounting mechanism removed.

The pelvic region 50 is also hollow and includes an inner surface 60 defining an opening 62 and an inner cavity 64 that contains the pelvic support structure 100. In certain embodiments, such as shown in FIGS. 2, 3, and 5, a flap member 70 extends from the pelvic region 50 that includes an inner surface 72 and an opposing outer surface 74, with the inner surface 72 further defining the opening 62. The inner surface 72 is sized and shaped to receive the abdomen member (not shown), as will be described further below. The outer skin 44A of the pelvic member 40 within the pelvic region 50 also includes a pair of accessible openings 45 that extend inwards towards the inner skin 44B.

As best shown in FIG. 2 and as noted above, the upper thigh regions 52, 54 are also hollow and includes an inner surface that further defines the inner cavity 64 and also defines respective insertion openings 56, 58. Accordingly, the inner cavity 64 extends within the pelvic region 50 and upper thigh regions 52, 54 between the opening 62 and the insertion openings 56, 58. In certain embodiments, the upper thigh regions 52, 54, corresponding to area of the insertion openings 56, 58, may each respectfully include an inner recessed portion 136 extending from the edge portion 130, and an inner stepped portion 138 extending from the inner recessed portion 136 in a direction opposite the edge portion 130. A step edge portion 140 extending transverse to each of the inner recessed portion 136 and inner stepped portion 138 connects the inner recessed portion 136 to the inner stepped portion 138.

Each of the respective upper thigh regions 52, 54 also includes one or more openings 142A respectively configured to receive a fastening member (not shown) used to secure the upper thigh bone 118 to the respective upper thigh regions 52, 54. In particular, the one or more openings 142A are equally spaced around a portion of the respective upper thigh regions 52, 54 and extend from the outer portion 128 to the inner stepped portion 138.

One or more locating key members 144, shown in the representative embodiment in FIG. 2 as three locating key members 144, are coupled to, or integrally formed with, the inner recessed portion 136 and respectively extend inwardly from the inner recessed portion 136. Each of the locating key members 144 includes an opening 146 extending transverse and inward from an interior surface 148. Preferably, the opening 146 in a respective one of the locating key members 144 is aligned with and sized to correspond to a corresponding one openings 142B extending from the outer portion 128 to the inner recessed portion 136 of the respective upper thigh region 52, 54. The interior surface 148 of the locating key members 144, and interior surface 152 of the inner recessed portion 136 not including the locating key members 144, and an interior surface 154 of the step edge portion 140 collectively define an interior mating surface 156, 158. In these embodiments, the interior mating surface 156, 158 of each of the respective upper thigh regions 56, 58 of the pelvic member 40 is sized and shaped to receive a corresponding exterior mating surface of one respective lower thigh members (not shown), as will be described further below.

In order to prevent separation of the inner surface 60 of the simulated flesh 41 within the region 50 from the exterior surface 112 of the bone 110 during a crash test simulation, a mounting mechanism 200 is utilized for coupling the hollow member 40 to the support structure 100 that maintains the positioning of the inner surface 60 of the simulated flesh 41 of the region 50 relative to the exterior surface 112 of each of the pair of bones 110 during crash test simulations. As mentioned above, the illustrated example is the pelvis, but any other area of the anthropomorphic test device could have the mounting mechanism 200.

The mounting mechanism 200 includes one or more inserts 210 that are coupled within the simulated flesh 41 corresponding to the region 50. The mounting mechanism 200 also includes one or more fastening members 240, with a respective one of the one or more fastening members 240 inserted within a corresponding insert 210 and secured to a respective one of the bones 110.

Figure 7D:
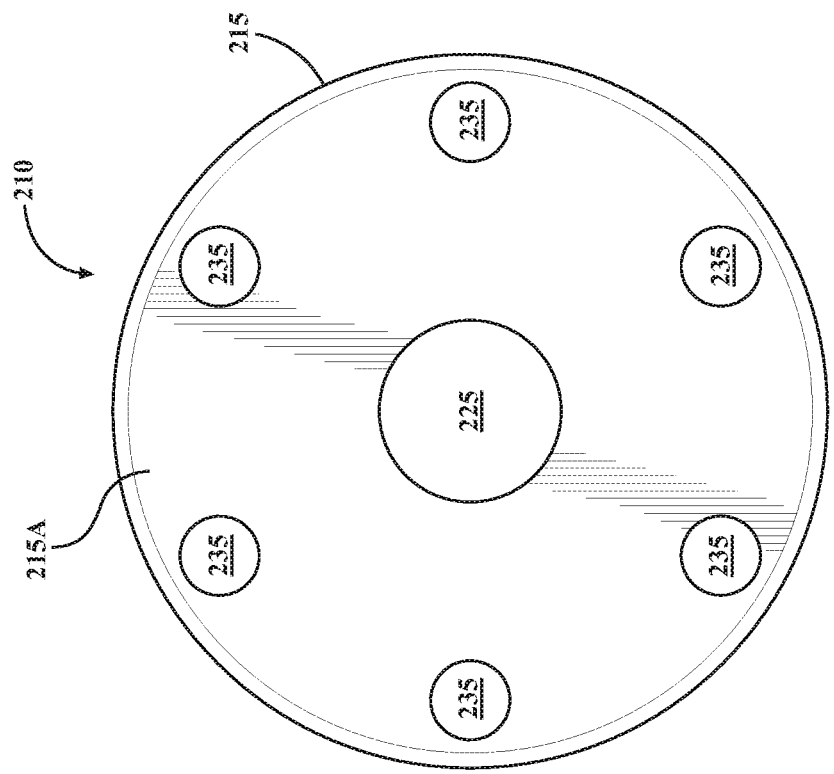
Figure 7C:
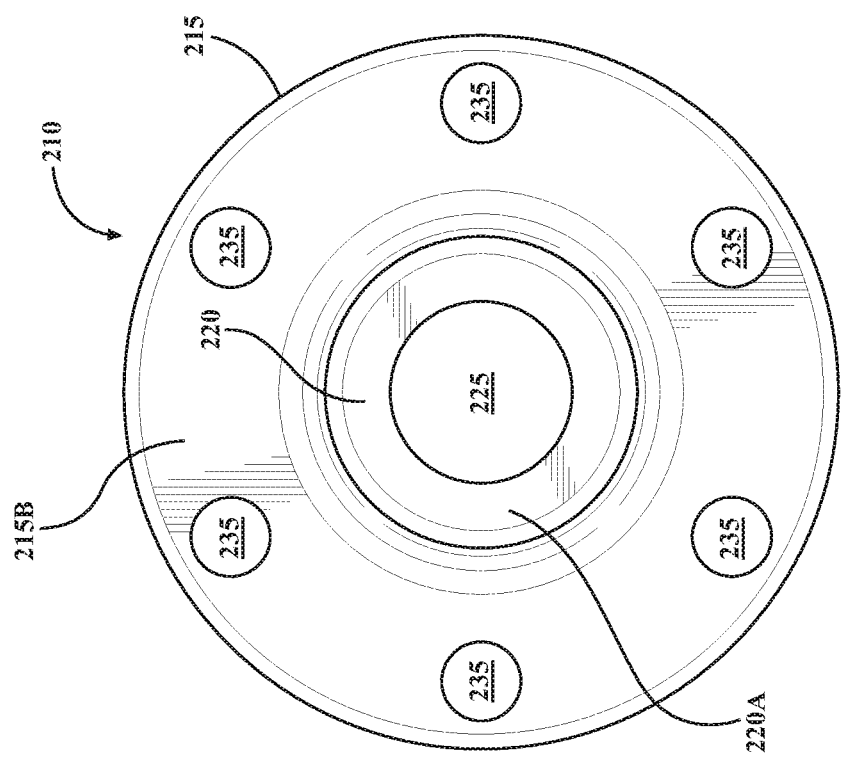

The inserts 210, as best shown in FIGS. 7A-7D, include a flange portion 215, sometimes alternatively referred to as a flange, generally in the shape of a disc, having an outer surface 215A and an opposing inner surface 215B. The insert 210 also includes an elongated portion 220 extending from the inner surface 215B in a direction opposite of and away from the outer surface 215A. The elongated member 220 terminates into an end surface 220A opposite inner surface 215B, and in particular a flat end surface 220A. The elongated portion 220 is hollow, and thus partially defines an elongated opening 225 extending there within from the tubular-shaped end surface 220A. As illustrated the central elongated opening 225 also extends through the inner surface 215B to the outer surface 215A of the flange portion 215. As such, the elongated opening 225 may be defined as extending through both the flange portion 215 and the elongated portion 220 of the insert 210 and between the outer surface 215A and the tubular-shaped end surface 220A. The flange portion 215 may also include one or more flange openings 235 extending between the outer surface 215A and the inner surface 215B that are spaced from and are extending generally parallel to the central elongated opening 225. In certain embodiments, such as best shown in FIGS. 7C and 7D, the flange openings 235 are spaced circumferentially around the elongated opening 225. In certain embodiments, the inserts 210 are formed from a hard plastic material or a hard reinforced plastic material, while in other embodiments that inserts 210 may be formed from a metal or metal alloy.

The elongated portion 220, in certain embodiments, is circular in cross-section and can therefore the outer surface 220B of the elongated portion can define an outer diameter OD (see FIG. 7B). The outer diameter OD of the outer surface 220B of the elongated portion 220 having a circular cross-section, as best illustrated in FIGS. 8 and 9, is less than a corresponding inner diameter ID of the circular wall region 178, with the difference in the diameters functioning to provide a tolerance/gap between the tubular region 220 of the insert 210 and the circular wall 178 when mounting the member 40 to the bone 110, as will be described in further detail below. In other embodiments wherein the elongated portion 220 is not circular in cross-section, the longest cross-sectional length of the outer surface 220B of the elongated portion 220, located adjacent to the end surface 220A, is less than a corresponding inner diameter ID of the circular wall region 178. Even still further, in certain other embodiments wherein the elongated portion 220 is not circular in cross-section and wherein the inner surface of the wall region 178 is also not circular, the outer surface 220B of the elongated portion 220 located adjacent to the end surface 220A is configured to be received within the corresponding inner surface of the wall portion 178.

The fastening member 240, as best shown in FIG. 8, includes a head portion 242 and a shank portion 244 extending from the head portion 242. The shank portion 244 terminates into a tip region 246. The shank portion 244 is preferably tubular in shape and is sized to be inserted within the tubular opening 225 of the elongated portion 220 and extend within the receiving opening 174 of the bone 110. In certain embodiments, where the fastening member 240 is a screw, the outer surface of the tubular shank portion may be threaded with a tapering groove (not shown) that spirals towards the tip region 246 such that the spirals is received and secured within the receiving opening 174 of the bone 110 (which is preferably also threaded to correspond to the spiral shape), while in other embodiments (such as shown in FIG. 8) the outer surface of the tubular shank portion 244 is smooth but is still similarly received and secured within the receiving opening 174 of the bone 110.

To utilize the mounting mechanism 200, as best shown in FIGS. 8 and 9, the insert 210 is introduced within the simulated flesh 41 in a desired position corresponding to a particular portion of the region 50, such as in proximity to a respective one of the bones 110. In particular, the insert 210 is introduced within the pre-formed skin portion 44 such that the flange portion 215 is contained within interior of the inner and outer skin 44A, 44B and such that the elongated portion 220 extends through the inner skin portion 44B in a direction towards the desired location on the exterior surface 112 of the respective one of the bones 110. The foam material is then introduced within interior of the inner and outer skin 44A, 44B via a molding process through the opening 45 in the outer skin 44A and fills the one or more flange openings 235 (see FIG. 8). An open cavity region 47 is created within the skin portion 44 during this molding process that is not filled with the foam portion 42 with the open cavity region 47 extending from the opening 45 in the outer skin portion 44A towards the inward portion of the outer surface 215A of the flange portion 215 adjacent to the tubular opening 225 and the opposing tubular region 220 extending from the inner surface 215B. The filling of the one or more flange openings 235 of the flange portion 215 with the foam portion 42 functions to prevent the insert 210 from spinning relative to the simulated flesh 41 and support structure 100 when the mounting mechanism 200 secures the member 40 to the respective bone 110 during a crash test simulation.

The shank portion 244 of a fastening member 240 is then introduced through the opening 45 in the outer skin portion 44A, through the open cavity region 47, and through the elongated opening 225 of the elongated portion 220 such that the tip portion 246 is brought into contact with the wall region 180 within the receiving opening 174. Force may then applied to the head portion 242 of the fastening member 240 such that the tip portion 246 extends further within the receiving opening 174 and engages with the wall portion 180 so that the hollow member 40 is secured within the support structure 100, shown herein as the pelvic bone 110, beneath the surface, typically wherein the tip portion 246 is secured (such as by engagement or threading engagement) with the wall region 180 within the receiving opening 174, as best shown in FIG. 9, and with the head portion 240 being positioned against the outer surface 215A of the flange portion 215. In particular, as shown in FIG. 9 in the secured position, the end surface 220A of the elongated portion 220 is abutted against the corresponding bottom region 176 and inwardly from the wall region 178 with the tip portion 246 received and secured within the receiving opening 174. As noted above, the slight gap between the outer surface of the elongated portion 220 adjacent the end surface 220A and the inner surface of the wall region 178 provides the necessary tolerance and aids in aligning the insert 210 relative to the bone 110 such that the elongated opening 225 is aligned with the receiving opening 174.

The insert 210 mounts the simulated flesh 41 to the support structure 100, and in particular to the bone 110 as shown in FIGS. 2-6 and 8-9, to provide a positive mechanical coupling of member 40 to the support structure 100 while maintaining the positioning of the inner surface 60 of the simulated flesh 41, corresponding to the inner skin portion 44B, of the region 50 relative to the exterior surface 112 of each of the pair of bones 110 during crash test simulations. The flange portion 215 of the insert 210 is intended to provide large mounting area to increase the mechanical parts engagement between the simulated flesh 41 and the bone 110. By removing the fastening members 240, the simulated flesh 41 can easily be separated from the support structure 100, such as from the pelvic bone 110, to allow sensor installation and dummy maintenance.

In certain embodiments, a series of one or more sensors (one exemplary sensor 111 is shown in FIG. 3) may be coupled to the support structure 100 or to any anatomical components that sense movement of the crash test dummy 30, or any anatomical component of the crash test dummy 30, during a crash test simulation. These sensors 111 may also be coupled to a controller (shown as 113 in FIG. 3 and coupled to the sensor 111) that can record the physical response signals of the crash test dummy 30 during a crash test. Exemplary sensors 111 may also include load cells or the like.

Figure 6:
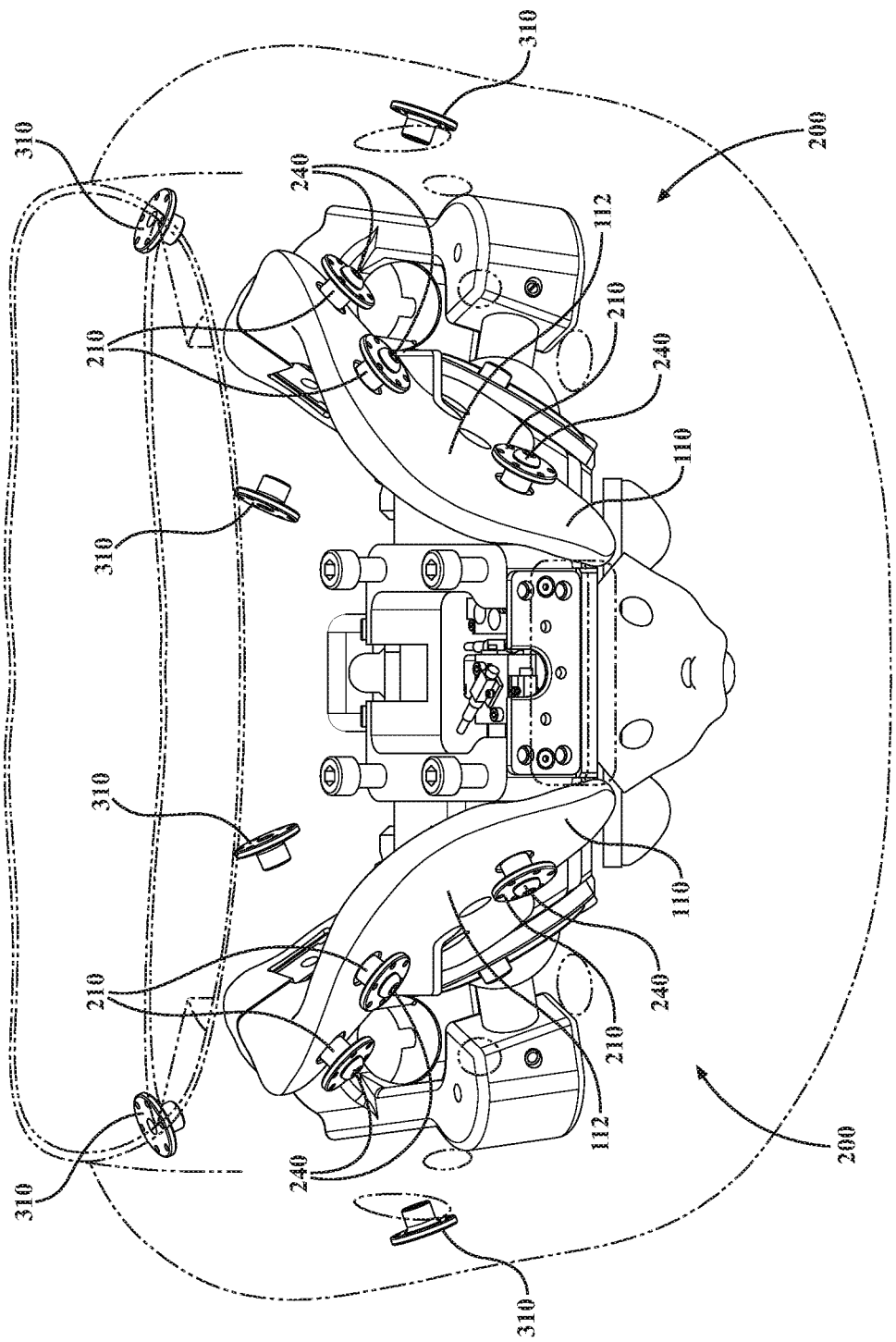
FIG. 6 is a rear perspective view of FIG. 2 in which the member of the assembly is made transparent.

In certain embodiments, wherein the fastening member 240 is a screw, and wherein the tubular shank portion 244 includes a threaded spiral groove, a wrench, such as a hex socket wrench, or other device may be used to rotate the shank portion 244 while force is applied to the head portion 242 in order to secure the tip portion 246 within the wall region 180 of the receiving opening 174 of the bone 110. This process may be repeated for securing the simulated flesh 41 to other portions of the support structure 100 or other portions of the bone 110 (FIGS. 5 and 6 illustrate wherein three sets of inserts 210 and fastening mechanisms 240 are secured to different locations on the exterior surface 112 of each respective one of the pelvic bones 110, although the number and location of the respective sets of inserts 210 and fastening mechanisms 240 of the mounting mechanism 200 may vary depending upon the desired degree of coupling).

The present invention addresses and overcomes the separation issues associated with prior art flesh coupling designs and therefore provides a crash test dummy having a more human-like response during collision testing.

In still further designs, the flesh coupling design can be utilized in crash test dummies 30 in which the member 40 is also coupled to the abdomen member and to a pair of respective upper thigh regions 56, 58 during crash test simulations.

The abdomen member (not shown) for use with the pelvis assembly 35 of the exemplary embodiment described herein includes its own inner core foam portion covered with a skin portion. The abdomen member is hollow to allow for the inclusion of an additional spinal structure to provide structural integrity to the crash test dummy 30 and to more closely simulate the structure and function of the abdominal region of a human (i.e., provide a more human-like response of the abdominal region in collision testing located above the pelvic region).

The abdomen member includes an upper portion that is configured to be positioned between and beneath a rib cage assembly (not shown) and a lower portion that is configured to be received within the opening 62 of the pelvic member 40, with the inner spinal structure of the abdomen member being coupled to, or otherwise secured to, the central support structure 115.

When the abdomen member is coupled to the pelvic member 40, in certain embodiments, the flap member 70, is positioned adjacent to and is brought into engaging contact, and in certain embodiments engaging and resilient contact, outwardly of the outer surface of the abdomen member. In this arrangement, the flap member 70 aids in maintaining the positioning of the abdomen member within the inner cavity 64 of the pelvic member 40 prior to any collision testing. In addition, the flap member 70 provides a continuous surface to interact with lap belt, and aids in minimizing or preventing separation issues between the abdomen member and the pelvis member 40 that may occur during collision testing, as compared with arrangements wherein the flap member 70 is not present.

Exemplary coupling designs to secure the pelvic region 50 to an upper band region of the abdomen member are described in more detail in U.S. Provisional Application No. 62/734,582 and entitled "Coupling Design for Abdomen Flesh of Anthropomorphic Test Device", filed on Sep. 21, 2018, and incorporated by reference in its entirety herein.

As noted above, in certain embodiments, the interior mating surface 156, 158 of each of the respective upper thigh regions 56, 58 of the pelvic member 40 is sized and shaped to receive a corresponding exterior mating surface of one respective lower thigh member (not shown). In these embodiments, the exterior mating surface of one respective lower thigh members may include an inwardly stepped portion extending from the edge portion, and an outwardly stepped portion extending from the inwardly stepped portion in a direction opposite the edge portion. In addition, the lower thigh member may include a step edge portion extending transversely to each of the inwardly stepped portions and outwardly stepped portions that connects the inwardly stepped portions to the outwardly stepped portions. Still further, the inwardly stepped portion may include one or more slot regions extending inwardly towards the inner surface of the inner portion. The number of slot regions, and the location of the one or more slot regions along the inwardly stepped portion, corresponds to the number and location of the one or more key members 144 of the respective upper thigh regions 52, 54.

Accordingly, the exterior surface of the slot regions, an exterior surface of the inwardly stepped portion not including the slot regions, and an exterior surface of the step edge portion collectively define an exterior mating surface. Still further, each one of the slot regions may also include an opening extending transverse and inward of the exterior surface of the slot region that optionally includes a threaded insert, with the location of the openings on the respective slot regions corresponding to, and aligned with, the corresponding openings 142B, 146 so as to receive a fastening member that is used to secure the respective upper thigh regions 52, 54 to the respective lower thigh member through the aligned openings 142B, 146. In particular, a respective one of the fastening members, preferably a bolt having a threaded end portion, may be inserted within the aligned openings 142B, 146 of the respective upper thigh regions 52, 54 and key member 144 and is threadingly engaged with the aligned opening (optionally including the threaded insert), thereby securing the respective upper thigh regions 52, 54 to the respective lower thigh member.

Exemplary thigh coupling mechanisms used to secure a respective upper thigh regions 52, 54 to the respective lower thigh member are described in more detail in U.S. Provisional Application No. 62/734,412 and entitled "Coupling Design for Thigh Flesh of Anthropomorphic Test Device", filed on Sep. 21, 2018, and incorporated by reference in its entirety herein.

In certain further embodiments, additional inserts, similar in size and shape to the inserts 210, can be used in other portions of the crash test dummy 30. By way of a non-limiting example, additional inserts (shown as 310 in FIGS. 3 and 6) can be used coupled within the simulated flesh 41 surrounding the opening 142B of the respective outer thigh member 52, 54, and optionally through the opening 146 in the locating key member 144. In addition, additional mounting mechanisms 200, including the inserts 210 and fastening members 240 as described above, can be used the couple the simulated flesh of any portion of the crash test dummy 30 to a respective support structure in the same manner as described above to prevent separation of the simulated flesh from the respective support structure in the same manner that the mounting mechanisms 200 described herein prevent separation of the simulated flesh from the bone 110.

The mounting mechanism 200, while illustrated with respect to use for securing the pelvic member 40 to one of the pelvic bones 110, can also be utilized for coupling other simulated flesh members to other support structures in a crash test dummy 30 in accordance with the methods and structure as recited above, and thus is not limited for use for securing the pelvic member 40 to one of the pelvic bones 110 as described above.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. An anthropomorphic test device configured for use in crash test simulations, said anthropomorphic test device comprising:
 a hollow member comprising a simulated flesh having an inner foam core portion and with said hollow member defining an inner cavity, said simulated flesh defining a channel extending partially through said inner foam core portion;
 a support structure received within said inner cavity; and
 a mounting mechanism coupled to each of said hollow member and said support structure for maintaining the positioning of said simulated flesh relative to said support structure during the crash test simulations, wherein said mounting mechanism comprises:
 one or more inserts each respectively coupled within said simulated flesh, wherein each of said one or more inserts comprises:
  a flange portion having an outer surface and an opposing inner surface, said flange portion positioned within said inner foam core portion such that said inner foam core portion covers at least a portion of said outer surface and covers at least a portion of said opposing inner surface of said flange portion to at least partially encapsulate said flange portion within said inner foam core portion with a portion of said outer surface not covered with said inner foam core portion and open to said channel; and
  an elongated portion extending from said flange portion towards said support structure, said elongated portion defining an elongated opening therethrough with said elongated opening open to said channel; and
 a fastening member passing through said channel and through said elongated openings and secured to said support structure, and
 wherein a width of said channel of said simulated flesh is greater than a width of said elongated opening of said insert.

2. The anthropomorphic test device of claim 1, wherein said flange portion includes one or more flange openings extending between said outer surface and said opposing inner surface with a portion of said inner foam core portion extending within each one of said one or more flange openings.

3. The anthropomorphic test device of claim 1, wherein each of said one or more fastening members comprises:
a head portion, and
a shank portion extending from said head portion, said shank portion terminating into a tip portion,
wherein said shank portion extends through said elongated opening such that said tip portion is received and secured within said support structure with said head portion positioned adjacent to an outer surface of said flange portion and within said channel.

4. The anthropomorphic test device of claim 3, wherein said support structure defines one or more receiving cavity portions contained within an exterior surface and including a receiving opening extending inwardly and transversely from said receiving cavity portion, and wherein said shank portion extends through said elongated opening such that said tip portion is received and secured within said receiving opening with said head portion positioned adjacent to said outer surface of said flange portion and within said channel.

5. The anthropomorphic test device of claim 4, wherein said receiving cavity portion includes:
a wall region extending transversely from said exterior surface, and
a bottom region extending transversely from said wall region with said receiving opening extending transversely from said bottom region; and
wherein an end surface of said elongated member is abutted to said bottom region when a respective one of said one or more fastening members is inserted within a corresponding one of said one or more inserts and secured to said support structure.

6. The anthropomorphic test device of claim 1 further comprising at least one sensor configured for sensing movement of the anthropomorphic test device during a crash test simulation.

7. The anthropomorphic test device of claim 1, wherein said hollow member comprises a hollow pelvic member including said simulated flesh having an inner foam core portion and with said hollow pelvic member defining an inner cavity, wherein said hollow pelvic member comprises:
a pelvic region having an inner surface defining an opening, and
a pair of upper thigh regions extending from said pelvic region, each of said pair of upper thigh regions having an inner surface and an opposing outer surface extending from an edge portion and with said inner surface defining an insertion opening, with said inner cavity defined within said pelvic region and said pair of upper thigh regions between said opening and each of said pair of insertion opening; and
wherein said support structure comprises a pelvic support structure received within said inner cavity, said pelvic support structure comprising:
a central support structure contained within said pelvic region,
a pair of pelvic bones coupled to said central support structure and contained within said pelvic region, each of said pair of pelvic bones having an exterior surface positioned adjacent to said inner surface of said pelvic region; and
a pair of upper thigh bones coupled to and extending from said central support structure, with one of said pair of upper thigh bones contained within a corresponding respective one of said pair of upper thigh regions;
wherein said fastening member passes through said elongated opening and is secured to a respective one of said pair of pelvic bones.

8. The anthropomorphic test device of claim 7, wherein each of said one or more fastening members comprises:
a head portion, and
a shank portion extending from said head portion, said shank portion terminating into a tip portion,
wherein said shank portion extends through said elongated opening such that said tip portion is received and secured within said respective one pelvic bone with said head portion positioned adjacent to an outer surface of said flange portion and within said channel.

9. The anthropomorphic test device of claim 7, wherein each of said pelvic bones defines one or more receiving cavity portions contained within said exterior surface and including a receiving opening extending inwardly and transversely from said receiving cavity portion, and wherein said shank portion extends through said elongated opening such that said tip portion extends through said elongated opening and is received and secured within said receiving opening with said head portion positioned adjacent to said outer surface of said flange portion and within channel.

10. The anthropomorphic test device of claim 9, wherein said receiving cavity portion includes:
a wall region extending transversely from said exterior surface, and
a bottom region extending transversely from said wall region with said receiving opening extending transversely from said bottom region; and
wherein an end surface of said elongated member is abutted to said bottom region when a respective one of said one or more fastening members is inserted within a corresponding one of said one or more inserts and secured to said support structure.

11. The anthropomorphic test device of claim 7, wherein said hollow pelvic member further comprises a flap member extending from said pelvic region and including an inner surface, with said inner surface of flap member further defining said opening of said pelvic region and with said inner surface configured to receive an abdomen member of said anthropomorphic test device.

12. The anthropomorphic test device of claim 11, wherein said inner surface of said flap member is configured to be in engaging contact with an outer surface of the abdomen member.

13. The anthropomorphic test device of claim 7, wherein each of said pair of upper thigh regions including at least one opening extending from said outer surface to said inner surface, and wherein the anthropomorphic test device further comprises:
at least one additional fastening member, with each of said at least one additional fasteners coupled within a corresponding one of said at least one openings for securing a respective one of said pair of upper thigh regions to a corresponding one of said pair of upper thigh bones.

14. The anthropomorphic test device of claim 13, wherein said inner surface of said insertion opening of each of said pair of upper thigh members comprises:
an inner recessed portion extending from said edge portion;
an inner stepped portion extending from said inner recessed portion in a direction opposite said edge portion, with said inner stepped portion including said one or more openings, and a step edge portion extending transverse to each of said inner recessed portion and said inner stepped portion and connecting said inner recessed portion to said inner stepped portion.

15. The anthropomorphic test device of claim 14, wherein said inner recessed portion includes one or more additional openings, and wherein the anthropomorphic test device further comprises:
one or more locating key members extending inwardly from said inner recessed portion within each of said pair of upper thigh members, with each of said one or more locating key members including a locating key member opening aligned with a corresponding one of said one or more additional openings extending through said inner recessed portion.

16. The anthropomorphic test device of claim 15 further comprising one or more additional fastening members, with a respective one of said one or more additional fastening members configured to be inserted through an aligned pair of one of said one or more locating key member openings and one of said one or more additional opening to secure said pelvic member to a lower thigh member of the anthropomorphic test device.

17. A method for forming an anthropomorphic test device configured for use in crash test simulations, said method comprising:
forming a hollow member including a simulated flesh having an inner foam core portion with the formed hollow member defining an inner cavity and forming a channel extending partially through said inner foam core portion;
coupling one or more inserts within the simulated flesh, wherein each of said one or more inserts comprises:
a flange portion having an outer surface and an opposing inner surface and positioned within the inner foam core portion such that the inner foam core portion covers at least a portion of the outer surface and at least a portion of said opposing inner surface of the flange portion for at least partially encapsulating the flange portion within the inner foam core portion with a portion of said outer surface not covered with said inner foam core portion and open to the channel; and
an elongated portion extending from the flange portion in a direction opposite the outer surface with the elongated portion defining an elongated opening open to said channel, with the elongated portion extending through the simulated flesh;
introducing a support structure within the inner cavity of the formed hollow member;
inserting a fastening member within the insert with the fastening member passing through the channel prior to passing through the elongated opening; and
securing each inserted fastening member to the support structure, and
forming the channel of the simulated flesh to have a width greater than a width of the elongated opening of the insert.

18. An anthropomorphic test device configured for use in crash test simulations, said anthropomorphic test device comprising:
a hollow member comprising a simulated flesh having an inner foam core portion and with said hollow member defining an inner cavity, wherein said hollow member comprises a hollow pelvic member including said simulated flesh having an inner foam core portion and with said hollow pelvic member defining an inner cavity, wherein said hollow pelvic member comprises:
a pelvic region having an inner surface defining an opening, and
a pair of upper thigh regions extending from said pelvic region, each of said pair of upper thigh regions having an inner surface and an opposing outer surface extending from an edge portion and with said inner surface defining an insertion opening, with said inner cavity defined within said pelvic region and said pair of upper thigh regions between said opening and each of said pair of insertion opening, wherein each of said pair of upper thigh regions including at least one opening extending from said outer surface to said inner surface;
a support structure received within said inner cavity, wherein said support structure comprises a pelvic support structure received within said inner cavity, said pelvic support structure comprising:
a central support structure contained within said pelvic region,
a pair of pelvic bones coupled to said central support structure and contained within said pelvic region, each of said pair of pelvic bones having an exterior surface positioned adjacent to said inner surface of said pelvic region; and
a pair of upper thigh bones coupled to and extending from said central support structure, with one of said pair of upper thigh bones contained within a corresponding respective one of said pair of upper thigh regions,
wherein said fastening member passes through said flange portion, extends through and along said elongated portion, and is secured to a respective one of said pair of pelvic bones; and
a mounting mechanism coupled to each of said hollow member and said support structure for maintaining the positioning of said simulated flesh relative to said support structure during the crash test simulations, wherein said mounting mechanism comprises:
one or more inserts each respectively coupled within said simulated flesh, wherein each of said one or more inserts comprises:
a flange portion positioned within said inner foam core portion;
an elongated portion extending from said flange portion towards said support structure;
a fastening member passing through said flange portion, extending through and along said elongated portion, and secured to said support structure; and
at least one additional fastening member, with each of said at least one additional fasteners coupled within a corresponding one of said at least one openings for securing a respective one of said pair of upper thigh regions to a corresponding one of said pair of upper thigh bones,
wherein said inner surface of said insertion opening of each of said pair of upper thigh members comprises:
an inner recessed portion extending from said edge portion;
an inner stepped portion extending from said inner recessed portion in a direction opposite said edge portion, with said inner stepped portion including said one or more openings, and a step edge portion extending transverse to each of said inner recessed portion and said inner stepped portion and connecting said inner recessed portion to said inner stepped portion.

19. The anthropomorphic test device of claim 18, wherein said inner recessed portion includes one or more additional openings, and wherein the anthropomorphic test device further comprises:
one or more locating key members extending inwardly from said inner recessed portion within each of said pair of upper thigh members, with each of said one or more locating key members including a locating key member opening aligned with a corresponding one of said one or more additional openings extending through said inner recessed portion.

20. The anthropomorphic test device of claim 19 further comprising one or more additional fastening members, with a respective one of said one or more additional fastening members configured to be inserted through an aligned pair of one of said one or more locating key member openings and one of said one or more additional opening to secure said pelvic member to a lower thigh member of the anthropomorphic test device.

* * * * *

UNITED STATES PATENT AND TRADEMARK OFFICE
CERTIFICATE OF CORRECTION

PATENT NO. : 11,885,713 B2
APPLICATION NO. : 16/991546
DATED : January 30, 2024
INVENTOR(S) : Zhenwen J. Wang et al.

It is certified that error appears in the above-identified patent and that said Letters Patent is hereby corrected as shown below:

In the Claims

Column 10, Line 57 (Claim 1): delete "elongated openings" and insert therefor -- elongated opening --.

Signed and Sealed this
Thirtieth Day of July, 2024

Katherine Kelly Vidal
*Director of the United States Patent and Trademark Office*